Feb. 27, 1968  V. A. NELSON  3,370,602
AUTOMATIC FLOW DIVERTER VALVE
Filed Aug. 24, 1965  2 Sheets-Sheet 1
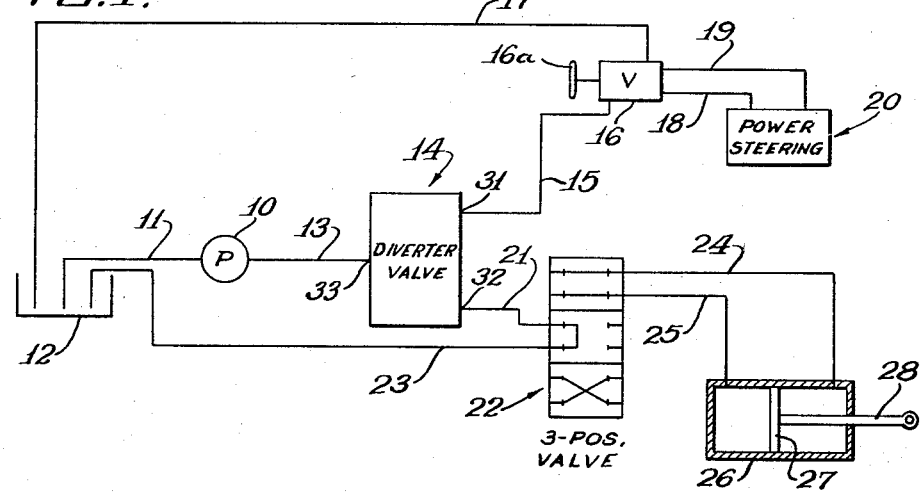
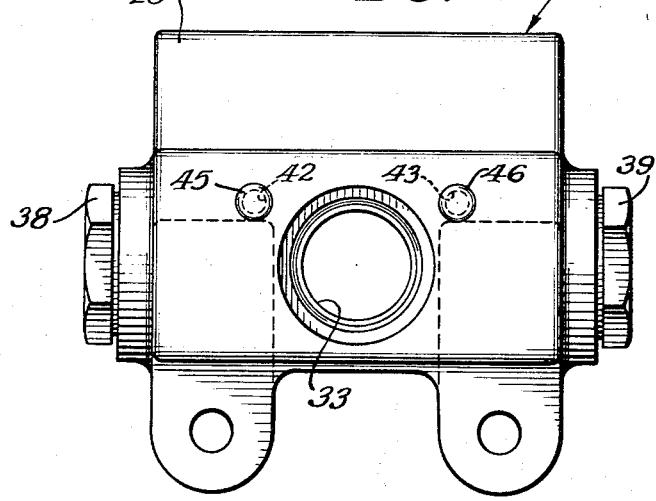
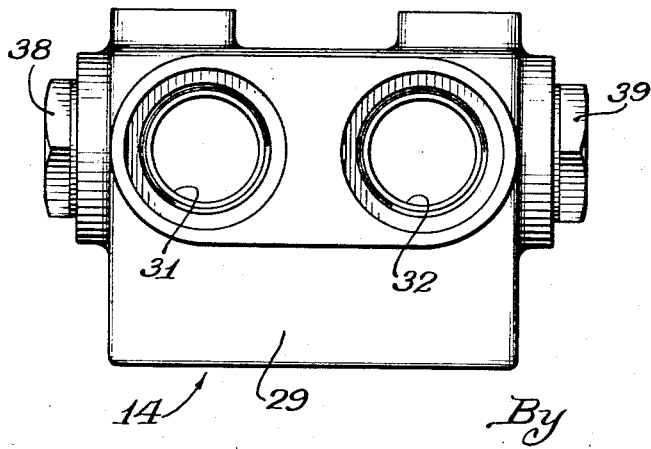
Inventor:
Vaughn A. Nelson
By
Atty.

Feb. 27, 1968  V. A. NELSON  3,370,602
AUTOMATIC FLOW DIVERTER VALVE
Filed Aug. 24, 1965  2 Sheets-Sheet 2
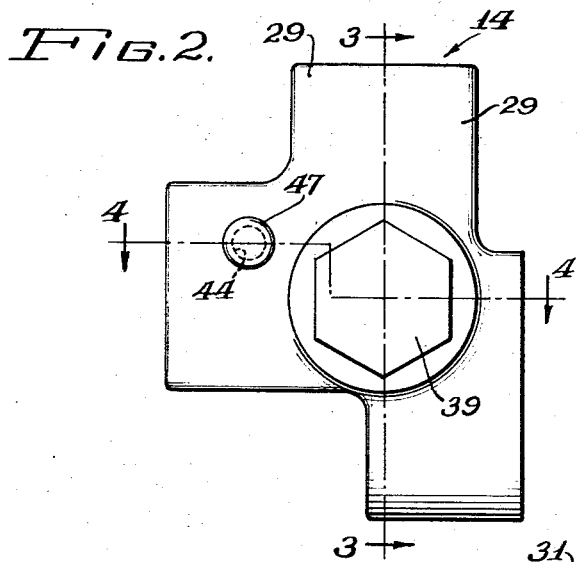
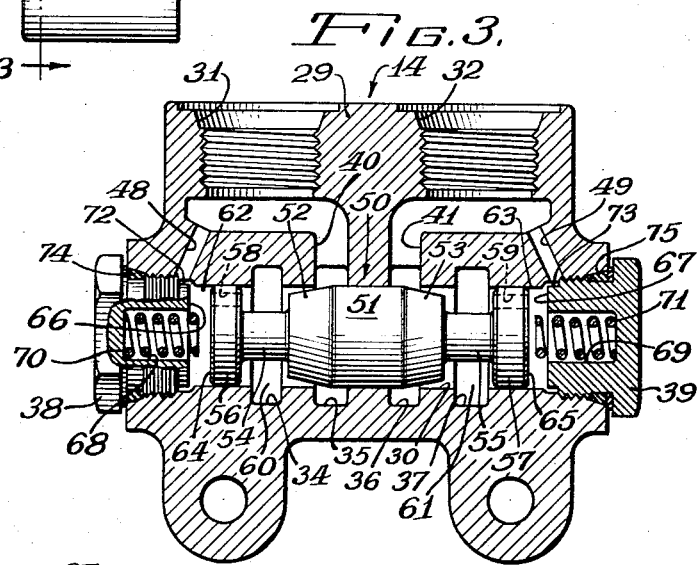
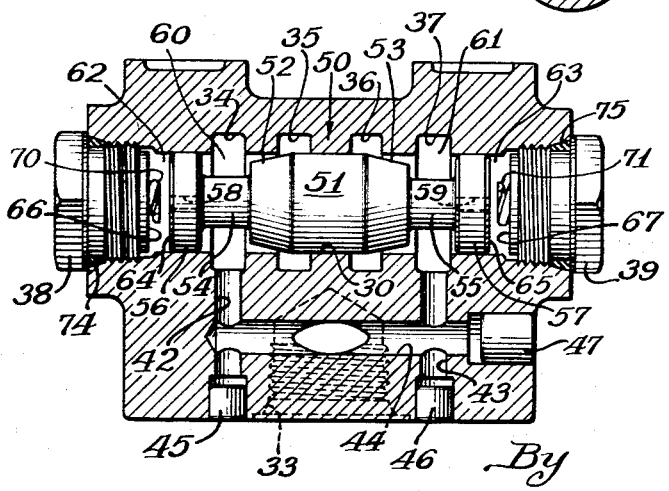
Inventor;
Vaughn A. Nelson
Walter L. Geary
Atty.

United States Patent Office 3,370,602
Patented Feb. 27, 1968

3,370,602
AUTOMATIC FLOW DIVERTER VALVE
Vaughn A. Nelson, Downers Grove, Ill., assignor to International Harvester Company, a corporation of Delaware
Filed Aug. 24, 1965, Ser. No. 482,118
10 Claims. (Cl. 137—101)

This invention relates to valves for controlling the flow of fluid, but more particularly to that type of valve adapted to divert the flow of fluid selectively to either of two outlets as required by the demands of associated hydraulic circuits.

Heretofore it has been known to provide valves of this type which were manually operable, but simple and reliable valves adapted to perform such diverting operation automatically upon the actuation of a control valve in an allied hydraulic circuit are virtually unknown on the commercial markets. It is a principal object of this invention, therefore, to provide an improved flow diverter valve that is simple, reliable and readily fabricated and which is automatically operable for diverting the flow of fluid to either of two hydraulic circuits as demanded by a respective one of said circuits.

Another object is to provide a novel flow diverter valve which is automatically operable for diverting fluid flow to either of two work-producing devices as demanded by the selective operation of said devices and which is responsive to the flow of fluid in the respective one of the hydraulic circuits requiring such flow.

A further object is to provide a flow diverter valve arranged so that when fluid flow is being diverted through one portion of said valve to one associated hydraulic circuit under normal using pressure conditions in said circuit a small quantity of pilot fluid flow is simultaneously being bled through another portion of said valve and a second associated circuit to the source of said fluid.

A still further object is to provide a spool-type reciprocably operable valve interposable between a source of fluid pressure and two using hydraulic circuits, and wherein pressure demands in one of the circuits is effective to cause automatic shifting of the spool thereof for directing a substantial portion of the fluid flow from the pressure source to the circuit creating the demand for said flow.

The foregoing and other objects and features of the invention will become apparent as the disclosure is more fully made in the following detailed description of a preferred embodiment of the invention as illustrated in the accompanying sheets of drawings, in which:

FIGURE 1 is a schematic showing of a hydraulic system employing a diverter valve therein of the type disclosed in the present invention;

FIGURE 2 is an end elevational view of a diverter valve fashioned according to the present invention;

FIGURE 3 is a generally vertical and longitudinal sectional view taken along the line 3—3 of FIGURE 2;

FIGURE 4 is a generally horizontal and longitudinal sectional view taken along the line 4—4 of FIGURE 2;

FIGURE 5 is a front elevational view of the proposed valve; and

FIGURE 6 is a top plan view of the proposed valve.

Referring now to FIGURE 1 of the drawings, where there is depicted a schematic representation of one preferred application of the present invention, it will be seen that the general organization of such an installation includes a source of hydraulic pressure such as the pump 10, the inlet of which is connected by a conduit 11 to a reservoir source of fluid 12, while the output or pressure side of said pump is connected by a conduit 13 to a diverter valve assembly indicated generally by the reference numeral 14. One outlet of said diverter valve connects by conduit 15 with a control valve 16 operated by a steering wheel 16a and in turn connected by conduit 17 with reservoir 12. Valve 16 also connects by conduits 18, 19 to a hydraulic device such as the power steering operating mechanism indicated generally by the reference numeral 20 which latter device may control the operation of the steerable wheels of a vehicle by conventional linkage means but none of which is shown since all of this is well known. This may be designated for simplification as circuit No. 1. The second outlet of diverter valve 14 may connect by conduit 21 to a conventional manually-operated control valve such as the three position or three way unit indicated at 22, the return side of which connects by conduit 23 with reservoir 12. Conduits 24 and 25 connect the opposite side or work ports of valve 22 with opposite ends of a hydraulic cylinder 26, the piston 27 of which may be operatively connected through its connecting rod 28 to suitable lifting mechanism, such as a back hoe or the like, not shown. This may be designated as circuit No. 2. Although the application shown herein suggests employment of the proposed diverter valve with a hydraulic system incorporating a power steering mechanism therein a hydraulic circuit having a back hoe mechanism therein, it will be readily appreciated that the utilization of these particular devices is for the purpose of illustration only, and not limitation, since the proposed invention is equally adaptable for use with a variety of other hydraulic work-producing devices, generally of the type wherein only one such device requires fluid flow at any given time from a common source of pressure. In the application proposed herein it will be recognized that generally when the back-hoe mechanism requires fluid pressure to operate it the power steering mechanism will not be demanding fluid pressure and vice versa, hence fluid flow may effectively be diverted alternatively from one of these using units to the other.

The valve indicated by the reference numeral 16 may be a conventional hydraulic steering control valve and pump unit of the type marketed commercially by Ross-Gear and Tool Company, Inc., of Lafayette, Indiana, or of the type unit disclosed in the Moyer et al., U.S. Patent No. 3,059,717 dated Oct. 23, 1962.

Reference may be had now to FIGURES 2–6 of the drawings for a more complete disclosure of the diverter valve assembly comprising the present invention. The valve indicated generally at 14 is fashioned with a body casing or housing member 29 having a central longitudinally extending bore 30 therethrough, outlet or motor port openings 31, 32 adapted for fluid flow connection with the respective conduits 15 and 21, and an inlet port opening 33 adapted for fluid flow connection to pump 10 through the conduit 13. Bore 30 is fashioned with a plurality of axially spaced annular grooves or recesses 34, 35, 36 and 37 opening thereinto while the opposite ends of said bore may be covered by closure plugs 38, 39 threadably received in the ends of the bore. A passage 40 continuously communicates annular groove 35 with port opening 31 while a similar passage 41 continuously communicates annular groove 36 with port opening 32. A transverse passage 42 that may be fashioned as extending inwardly from one face of body member 29 communicates with annular groove 34 and a similar transverse passage 43 communicates with annular groove 37, while a longitudinally extending passage 44 that may be fashioned as extending inwardly from one end face of body member 29 intersects and continuously communicatively connects passages 42 and 43 with inlet port opening 33. Suitable closure plugs 45, 46, 47 may be provided to close the outwardly opening ends of the respective passages 42, 43 and 44.

It will be understood, of course, that other ways of fashioning the passages 42, 43 and 44 may be provided without deviating from any of the inventive concepts hereof. Small diametered bleed passages 48 and 49 extending between opposite ends of bore 30 and the respective passages 40 and 41 serve to communicate the end areas of said bore with the remote ends of the latter passages. Suitable or conventional threaded connecting means, not shown, may be used for connecting the port openings 31, 32 and 33 with the respectively interconnected conduits 15, 21 and 13 as is well understood.

The slidable spool member indicated generally at 50 may comprise a central land portion 51 having conventionally tapered end portions 52, 53 on opposite ends thereof and interconnected by reduced section portions 54, 55 with respective oppositely disposed land portions 56, 57. A small diametered bleed orifice 58 extends axially through the land 56 while a similar bleed orifice 59 extends axially through land 57. The latter bleed orifices serve to communicate the areas of chambers 60, 61 formed by the reduced section portions 54, 55 proximate the annular grooves 34 and 37 with the respective variable volume chambers or areas 62, 63 formed between the outwardly extending end faces 64, 65 of lands 56 and 57 and the proximate inwardly facing end surfaces 66, 67 of the respective closure plugs 38 and 39.

Closure plugs 38, 39 may be fashioned with inwardly opening recesses 68, 69 therein that seatingly receive respective coil springs 70, 71, one in each said recess. Said springs are dimensioned so that in their rest positions they will project or extend a short distance axially beyond the adjacent end faces 66, 67 of the respectively associated closure plugs for a purpose which will presently be explained. The inner end portions of plugs 38, 39 are fashioned with a slightly reduced diameter (FIGURE 3) in order to provide annular areas or passageways 72, 73 that permit fluid communication between the chambers 62, 63 and the respective bleed passages 48, 49. Suitable liquid seals, such as indicated at 74, 75 may be provided to prevent fluid leakage outwardly in the areas of closure plugs 38, 39.

*Operation*

When neither of the associated hydraulic circuits are demanding a flow of fluid pressure for the operation thereof, the fluid pressure on opposite ends of the valve spool 50 will be equalized and said spool will normally be positioned within the bore midway of the ends thereof as depicted in FIGURES 3 and 4 of the drawings. At this time any flow of fluid thereto from pump 10 will be divided by way of connecting passage 44, transverse passages 42, 43, chambers 60, 61, bleed orifices 58, 59, chambers 62, 63, bleed passages 48, 49, passages 40, 41 and out through ports 31, 32 to the respective hydraulic circuits, and thence through the respective valves of said circuits which valves, being in neutral with the associated circuits inoperative, will pass the fluid flow back to reservoir 12. Assume now that valve 16 is actuated as by turning steering wheel 16a, thus creating a demand in the associated No. 1 circuit for flow of fluid, whereupon in response to increased flow of fluid to said circuit through chamber 60 spool 50 is moved rightwardly, as viewed in FIGURES 3 and 4, into abutting engagement with spring 71, thereby opening up chamber 60 to free communication with passage 40, port 31 and through conduit 15 to valve 16 where such flow becomes available for actuation of the power steering mechanism 20 as required. Simultaneous with this action, a small or restricted quantity of pilot flow fluid continues to bleed through chamber 61, bleed orifice 59, chamber 63, area 73, bleed passage 49, port 32, conduit 21 and valve 22 back to reservoir 12. However, in the event pressure in circuit No. 1 is increased, the pressure on the left end of valve spool 50 is correspondingly increased sufficiently to further move said spool rightwardly so as to compress spring 71 and cause the proximate end face 65 on spool land 57 to tightly abut or engage the end face 67 of closure plug 39 thereby closing off the bleed orifice 59 and completely restricting flow therethrough so that no fluid can exit to circuit No. 1, whereupon all fluid flow is thereupon directed to circuit No. 1. When pressure is reduced again in circuit No. 1, valve spool 50 shifts back to a position such that spring 71 is no longer compressed and a small amount of pilot fluid flow again resumes through orifice 59 and circuit No. 2 to reservoir 12.

Now, assume that it becomes desirable to provide fluid flow for circuit No. 2 instead of circuit No. 1. In which case, since the demand of circuit No. 1 will have ceased, both valves 16 and 22 will be in neutral and spool 50 will have returned to its normally centered position midway between the ends of bore 30. Now as valve 22 is actuated by the operator, by way of conventional means, not shown, to provide fluid flow for the operation of circuit No. 2, this causes the small pilot flow through bleed orifice 59 to cease momentarily, whereupon the fluid pressure on the right end of spool 50 being static becomes equal to the fluid pressure at inlet port 33 which is higher than the fluid pressure on the left end of spool 50 because of the pressure drop of the fluid passing through the left inlet orifice-like passages 44 and 42 on its way through bleed orifice 58 and port 31 back to the reservoir. This unbalanced force on the valve spool causes it to move to the left, as viewed in FIGURES 3 and 4, closing off port 31 against the flow of fluid thereto except for the pilot flow through bleed passage 58 to circuit No. 1 and concomitant therewith opening port 32 through which fluid may now flow freely and unrestricted to circuit No. 2. The function of the valve now is identical to that heretofore described when fluid was flowing for use in circuit No. 1. Because of the diverter valve's symmetrical construction, the spool 50 may be moved back to the right, reactivating circuit No. 1 by the same procedure that circuit No. 2 was activated.

It should now be apparent that a novel diverter valve automatically operable responsive to demands for fluid pressure in one of a plurality of associated hydraulic circuits has been shown and described, and it is to be understood that changes may be made in the construction without departing from the spirit of the invention or the scope thereof as defined in the appended claims.

What is claimed is:

1. A valve for diverting the flow of fluid from a source alternatively to first and second ports, comprising: a body member having a bore therein; a valve member reciprocably disposed in said bore; an inlet port adapted for connection with a source of fluid flow and a pair of outlet ports formed in said body, and having all said ports communicating with said bore; means formed in part in said body and in part in said valve member providing bleed passages normally communicatively connecting said inlet with said outlet ports; said valve member being reciprocably movable, responsive to a pressure differential between said outlet ports created as a result of establishment of demand for fluid flow in one of said outlet ports, for diverting a substantial portion of the fluid flow from the inlet port to the respective one of said outlet ports demanding said flow, while simultaneously maintaining a small fluid flow through the bleed passage interconnecting the inlet port and the other one of said outlet ports.

2. The valve assembly defined in claim 1 but further characterized in that upon an increase in pressure in the one of said outlet ports through which a substantial portion of the fluid flow from the inlet port is being diverted the valve member is slidably actuated responsive to said increased pressure to cut-off the small quantity of fluid flow being bled from the inlet to the other of said outlet ports whereupon the total fluid flow through the inlet port is diverted to one of said outlet ports.

3. The valve assembly defined in claim 1 and further characterized in that said bleed passage means includes at least one small diametered passage extending through each end portion of said valve member, and at least one small diametered passage communicatively connected between each end portion of the bore and a proximate one of the outlet ports.

4. A valve for selectively diverting the flow of fluid from a source to one of two outlets, comprising: a body member having a bore therethrough and a plurality of annular recesses opening into said bore and spaced axially therealong and designated one, two, three and four from one end to the other; an inlet and a pair of outlet ports formed in said body, and separate means forming passages providing communication between the inlet port and annular recesses one and four and between one of said outlet ports and annular recess two and between the other of said outlet ports and annular recess three; a valve member slidably disposed in said bore and including three axially spaced lands with two grooves therebetween, and having two of said lands fashioned with small diametered orifices extending axially therethrough; separate means providing small diametered bleed passages communicating opposite end areas of said bore with the respective passages communicating the outlet ports with annular recesses two and three; separate closure means sealing opposite ends of said bore and providing abutment surfaces for opposite ends of said valve member; resilient means mounted one each in said closure means and extending axially inwardly beyond the respective abutment surfaces; said valve member being slidably movable, responsive to establishment of demand for fluid flow in one of said outlet ports, for providing substantially unrestricted fluid communication between the inlet port and the respective one of said outlet ports establishing the demand for fluid flow, while simultaneously providing a restricted fluid communication between the inlet port and the other one of said outlet ports, and being further movable, responsive to an increase in pressure in the one of said outlet ports demanding fluid flow, for bringing one end of said valve member into abutting engagement with an adjacent abutting surface of a respective closure means to shut off fluid flow through the respective valve orifice and thereby completely restrict fluid communication between the inlet port and the other one of said outlet ports.

5. A valve for diverting the flow of fluid from a source alternatively between two outlets, comprising: a body member having a bore therethrough and a plurality of annular recesses opening into said bore and spaced axially therealong; an inlet and a pair of outlet ports formed in said body, and separate means forming passages providing communication between the inlet port and certain of said annular recesses and between said outlet ports and certain others of said annular recesses; separate closure means sealing opposite ends of said bore; a valve member slidably disposed in said bore and fashioned to include three axially spaced lands with two grooves therebetween, and having two of said lands fashioned with small diametered orifices extending axially therethrough; separate means providing small diametered bleed passages communicating opposite end areas of said bore with the respective passages communicating the outlet ports with certain others of said annular recesses; said valve member being slidably movable, responsive to establishment of demand for fluid flow in one of said outlet ports, for providing substantially unrestricted fluid communication between the inlet port and the respective one of said outlet ports establishing the demand for fluid flow, while simultaneously providing a restricted fluid communication between the inlet port and the other one of said outlet ports.

6. A valve for diverting the flow of fluid from a source alternatively to first and second outlets, comprising: a body member having a bore therethrough and four annular recesses opening into said bore and spaced axially therealong; an inlet and a pair of outlet ports formed in said body; first means providing passages communicating said inlet port with the end ones of said annular recesses; second means providing passages respectively communicating said outlet ports with the central ones of said annular recesses; separate closure means removably mounted in opposite ends of said bore and extending thereinto and having each of which said latter means fashioned with a reduced section portion adjacent the inner end thereof to provide an annular area therebetween and the surface of said bore; separate resilient means mounted one in each said closure means and extending axially outwardly therefrom into said bore; a valve member slidably disposed in said bore, and having a central land portion and a pair of end land portions axially and oppositely disposed from said central portion and connected thereto by reduced section portions to provide annular chambers between said reduced section portions and the surface of said bore, and each of said end land portions having a small diametered opening extending axially therethrough; means formed in said body portion providing small diametered passages extending one each between said bore adjacent one of said annular areas and one of said passages communicating with a proximate one of said outlet ports; said valve member being reciprocably movable, responsive to a pressure differential between said outlet ports resulting from establishment of a demand for fluid flow in one of said outlet ports, for providing unrestricted fluid communication between the inlet port and the respective one of said outlet ports demanding flow while simultaneously providing a restricted fluid communication between the inlet port and the other one of said outlet ports, and being further reciprocably movable responsive to an increase in pressure in the one of said outlet ports demanding fluid flow for completely restricting fluid communication between the inlet port and the other one of said outlet ports.

7. A valve for diverting the flow of fluid from a source alternatively to first and second ports, comprising: a body having a bore therethrough; a valve member slidably disposed in said bore; an inlet port and a pair of outlet ports formed in said body and communicating with said bore; separate closure means mounted in opposite ends of said bore; separate resilient means mounted one in each of said closure means and extending therefrom into said bore; means formed in said body providing bleed passages at opposite ends of said bore continuously communicatively connecting said bore with said outlet ports; means providing axially extending orifices through opposite end portions of said valve member; said valve member being slidably operative, responsive to a demand for fluid flow in one outlet port, for diverting a substantial portion of the fluid flow through the inlet port to the respective outlet port demanding fluid flow, while simultaneously bleeding a small quantity of fluid flow from the inlet through the other outlet port until an increase in pressure in the one outlet port causes said valve member to move into compressing engagement with a respective one of said resilient means and into closely abutting relation with a respective one of said closure means to thereby cutoff the flow of bleed fluid through the proximate bleed passage from the inlet port to the other of said outlet ports.

8. A valve for selectively diverting a flow of fluid from one using circuit to another using circuit, comprising: a body member having a bore therein, an inlet adapted for connection to a source of fluid flow, and a pair of outlets adapted for connection one each to a respective using hydraulic circuit; means communicating said inlet and outlets with said bore; a valve member slidably disposed in said bore and operatively responsive to a demand for fluid flow in either of the associated using circuits for establishing unrestricted fluid communication from said inlet to the outlet associated with the respective using circuit demanding fluid flow; means forming restricted passages communicating said inlet with each of said outlets for normally passing a small quantity of pilot fluid flow from the inlet to both said outlets when neither of the associated using circuits is demanding fluid flow and operative upon demand of fluid flow in one using circuit for passing a small quantity of pilot fluid flow from the inlet to the one of said outlets not demanding fluid flow simultaneous to the establishment of unrestricted fluid communication between the inlet and the outlet associated with the using circuit demanding fluid flow.

9. The valve structure defined in claim 8 and further characterized in that said restricted passages include small diametered passages formed in opposite end portions of said valve member, and small diametered passages connecting each said outlet with said bore.

10. The valve structure defined in claim 9 but further characterized in that upon an increase in pressure in the one of said outlets associated with the using circuit demanding fluid flow the valve member is slidably actuated responsive to said pressure increase to completely restrict fluid flow from the inlet to the outlet associated with the using circuit not demanding fluid flow until said increased pressure is reduced whereupon restricted fluid communication is re-established between the inlet and the outlet associated with the using circuit not demanding fluid flow.

References Cited

FOREIGN PATENTS 588,583    5/1947    Great Britain.

WILLIAM F. O'DEA, *Primary Examiner.*

H. COHN, *Assistant Examiner.*